United States Patent [19]

Bernfeld

[11] Patent Number: 4,496,163
[45] Date of Patent: Jan. 29, 1985

[54] ADAPTORS FOR A COLLET CHUCK

[76] Inventor: Kenneth G. Bernfeld, 5119 62nd St., Kenosha, Wis. 53142

[21] Appl. No.: 289,346

[22] Filed: Aug. 3, 1981

[51] Int. Cl.³ .................. B23B 5/22; B23B 31/10; B23B 5/00; B25G 3/10
[52] U.S. Cl. ................ 279/1 A; 279/1 ME; 279/46 R; 279/48
[58] Field of Search .............. 279/1 A, 46, 47, 48, 279/49, 50, 51, 52, 53, 54, 55

[56] References Cited

U.S. PATENT DOCUMENTS

| 1,582,445 | 4/1926 | Border. | |
|---|---|---|---|
| 1,765,362 | 6/1930 | Berry | 279/1 A |
| 1,862,856 | 6/1932 | Johnson | 279/46 |
| 2,458,889 | 1/1949 | Bloomquist | 279/47 |
| 2,478,195 | 8/1949 | Hull | 279/1 |
| 2,491,167 | 12/1949 | Drew | 279/48 |
| 3,026,116 | 3/1962 | Marini, Sr. | 279/48 |
| 3,049,358 | 8/1962 | Polos | 279/1 ME |
| 3,223,428 | 12/1965 | Walker | 279/36 |

FOREIGN PATENT DOCUMENTS

| 614611 | 7/1947 | United Kingdom | 279/46 |
| 1583687 | 1/1981 | United Kingdom | 279/1 A |

Primary Examiner—Paul A. Bell
Assistant Examiner—Paul M. Heyrana
Attorney, Agent, or Firm—Fuller, House & Hohenfeldt

[57] ABSTRACT

Adaptors for a double taper collet chuck in the form of first and second adaptor rings with inside tapers complementary in shape to collets and outside tapers interfitting with the collet chuck enable a particular collet chuck to handle a wide range of collets. The adaptors thus minimize the need for a changeover for different chuck sizes in multiple machining operations.

2 Claims, 2 Drawing Figures

U.S. Patent   Jan. 29, 1985   4,496,163
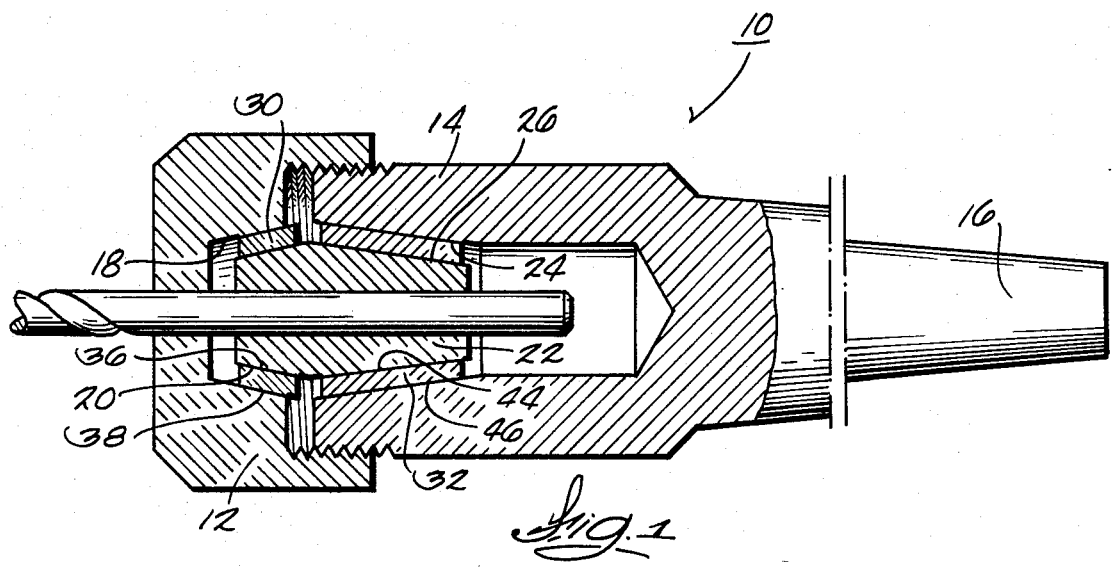
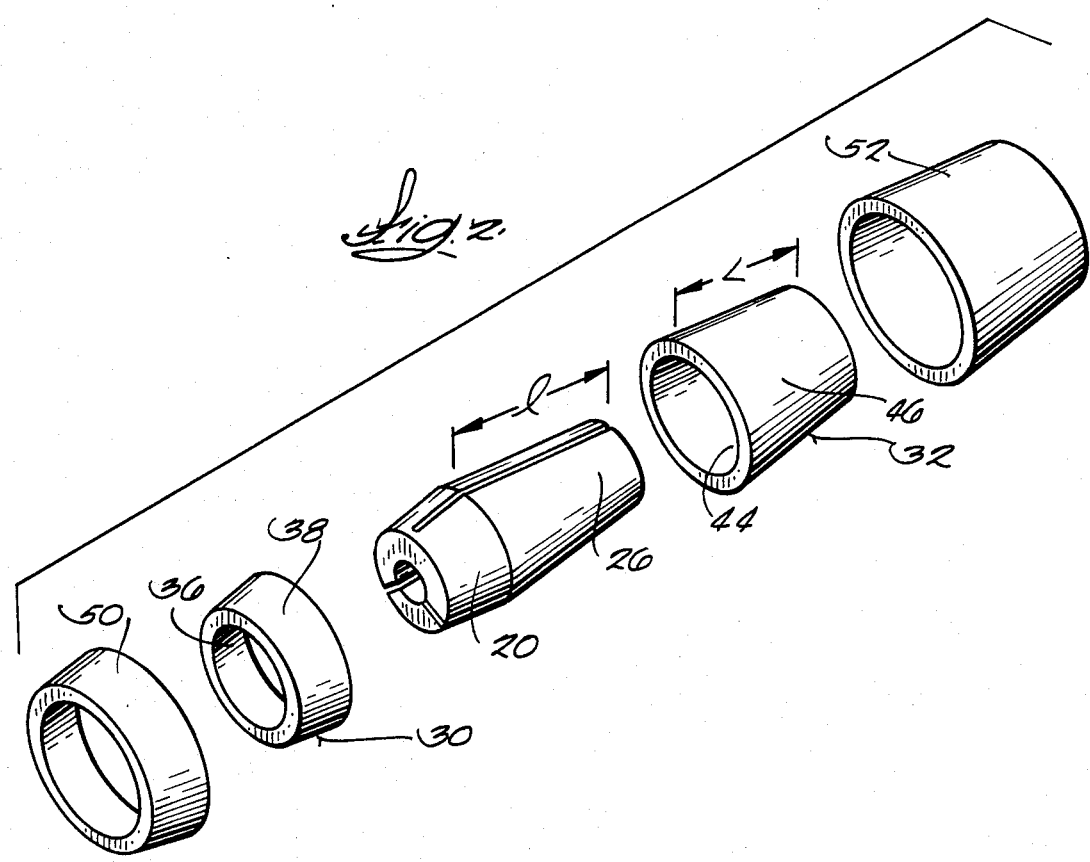

ADAPTORS FOR A COLLET CHUCK

BACKGROUND OF THE INVENTION

The invention relates to adaptors to minimize the number of double taper collet chucks required in an automated machining operation. Commercially available collet chucks are available to accept various collet ranges, such as 1/16" to ¼", ⅛" to ⅝", 3/16" to ½", ⅝" to ¾", ⅝" to 1" and ¾" to 1½". Hence, in multiple step machining operations changeover of different chuck sizes may be required when changing drill sizes, resulting in down time of the machine.

SUMMARY OF THE INVENTION

The invention provides adaptors to increase the range of one particular collet chuck to accommodate a wider variety of drill collets so that changeover of chucks is not required. This, of course, reduces set up time, reduces the number of tools required and hence minimizes the cost of a particular machining operation. With double taper collet chucks, two frusto-conical ring adaptors are employed. The insides of the adaptor rings have tapered surfaces which are complementary to and mate with the tapered surfaces on the collets. The outer surfaces of the collet adaptor rings have tapers complementary in shape to interfit with the tapers of the collet nut and collet chuck, respectively. Hence, a small collet can be received in a collet chuck which normally handles only larger size collets. One set of six adaptors with two adaptors to a set can acommodate collets from 1/16" to 1½".

Further objects, advantages and features of the invention will become apparent from the disclosure.

DESCRIPTION OF THE DRAWINGS

FIG. 1 is a sectional view of a collet chuck incorporating the adaptor rings of the invention.

FIG. 2 is a perspective view showing an assembly of two sets of collet adaptor rings with one collet.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, a collet chuck 10 is shown which has a nut 12 threaded on a chuck 14 which is connected to a shank 16 which interfits with the machine tool. The nut 12 conventionally has an interior tapered surface 18 which is complementary in taper angle and shape with the forwardly extending tapered surface 20 of a standard collet. The collet 22, as shown, is undersize for the collet chuck shown. The portion 14 of the collet chuck has an interior tapered surface 24 which in intended to receive and interfit with the rearwardly extending exterior tapered surface 26 of the collet 22.

In accordance with the invention, first and second adaptor rings 30 and 32 are provided to enable the chuck 14 to accommodate the small collet 22.

The adaptor ring 30 has an interior tapered surface 36 which is complementary in shape and adapted to interfit with the tapered surface 20 of the collet. The first adaptor ring 30 also includes an exterior tapered surface 38 which is adapted to interfit with the tapered surface 18 of the chuck nut 12. The second adaptor ring 32 has an interior surface 44 which is complementary to and interfits or mates with the collet surface 26. The exterior surface 46 of the adaptor ring 32 interfits with the surface 24 of the chuck. Hence the chuck can handle a wide range of collet sizes by using appropriate sets of adaptors. In addition, more than one set of adaptor rings can be used with a specific collet to increase the range which one particular collet chuck will accept. The length L of the taper on the adaptor rings (FIG. 2) desirably conforms to the length (l) of the corresponding taper on the collet. Similarly, the length of the forward adaptor ring should conform to the length of the forward taper on the collet. Thus the adaptor rings will fit within the chuck without interference.

In FIG. 2 a second set of collet rings 50 and 52 is shown which can be employed to make the collet 20 acceptable in a larger size collet chuck. Additional adaptor rings can also be employed.

I claim:

1. In a collet chuck assembly including a selected collet for a pre-selected drill size and a collet nut for a collet chuck wherein the collet chuck has an inside taper which mates with the outside rearwardly extending taper of the collet and the collet nut has an inside taper which mates with the outside forwardly extending taper of the collet, the improvement comprising a set of first and second adaptor rings, each adaptor ring having an inside frusto-conical surface and an outside frusto-conical surface parallel to the inside frusto-conical surface, said first adaptor ring having an inside taper complementary to the outside forwardly extending taper of the collet and an outside taper complementary to the inside taper of the collet nut and said second adaptor ring having an inside taper complementary to the outside rearwardly extending taper of the collect and an outside taper complementary to the inside taper of the collet chuck and wherein said adaptor rings enable use of any of a plurality of selected collets for a wide range of pre-selected drill sizes in a single collet chuck.

2. The improvement of claim 1 including a second set of adaptor rings which nest within said first set and interfit with said collet to enable said chuck to accept collets too small for said first set.

* * * * *